(12) United States Patent
Won et al.

(10) Patent No.: US 10,420,049 B2
(45) Date of Patent: Sep. 17, 2019

(54) SYNCHRONIZING CONFIGURATIONS BETWEEN ACCESS POINT CONTROLLERS OVER N+1 NETWORK

(71) Applicant: Fortinet, Inc., Sunnyvale, CA (US)

(72) Inventors: Chan Yeon Won, San Jose, CA (US); Rahul Kumar Ganju, Milpitas, CA (US)

(73) Assignee: Fortinet, Inc., Sunnyvale, CA (US)

( * ) Notice: Subject to any disclaimer, the term of this patent is extended or adjusted under 35 U.S.C. 154(b) by 129 days.

(21) Appl. No.: 15/640,891

(22) Filed: Jul. 3, 2017

(65) Prior Publication Data

US 2019/0007914 A1  Jan. 3, 2019

(51) Int. Cl.
| | |
|---|---|
| *H04W 56/00* | (2009.01) |
| *H04L 12/24* | (2006.01) |
| *H04L 29/08* | (2006.01) |
| *H04W 84/20* | (2009.01) |
| *H04W 88/12* | (2009.01) |

(52) U.S. Cl.
CPC ....... *H04W 56/001* (2013.01); *H04L 41/0816* (2013.01); *H04L 67/104* (2013.01); *H04W 84/20* (2013.01); *H04W 88/12* (2013.01)

(58) Field of Classification Search
CPC ... H04W 56/001; H04W 84/20; H04W 88/12; H04L 41/0816; H04L 67/104
See application file for complete search history.

(56) References Cited

U.S. PATENT DOCUMENTS

2015/0237002 A1\* 8/2015 Baniqued ............ H04L 61/2007
709/220
2015/0312820 A1\* 10/2015 Yang ................... H04W 36/023
370/331

\* cited by examiner

*Primary Examiner* — Eric Myers
(74) *Attorney, Agent, or Firm* — Law Office of Dorian Cartwright; Dorian Cartwright

(57) ABSTRACT

Systems and methods for synchronizing configurations between access point controllers (ACs) over N+1 network are provided. According to one embodiment, a first peer access point controller (AC) of a N+1 AC network sends a synchronizing request to a second peer AC of the n+1 AC network for synchronizing running configurations of the second peer AC. The first peer AC receives a running configuration package that contains the running configurations from the second peer AC and checks if the running configuration package is valid. If the package is valid, the first peer AC extracts the running configurations of the second peer AC from the running configuration package; and stores the running configurations of the second peer AC at a configuration repository of the first peer AC.

22 Claims, 6 Drawing Sheets

100

SYNCHRONIZING CONFIGURATIONS BETWEEN ACCESS POINT CONTROLLERS OVER N+1 NETWORK

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2017, Fortinet, Inc.

BACKGROUND

Field

Embodiments of the present invention generally relate to the field of wireless network management. In particular, various embodiments relate to synchronizing configurations between access point controllers (ACs) over N+1 network.

Description of the Related Art

Wireless access points (APs) are deployed to cover public areas, offices and families so that Wi-Fi-enabled devices may be connected to a private network or the Internet through a wireless network. When a large number of APs are deployed in a WiFi network, the wireless APs are connected to wireless access point controllers (ACs) and are managed by the ACs. In order to ensure availability of the WiFi network, a group (N) of ACs may have one (+1) backup AC to form N+1 network redundancy. In normal state, the group of ACs take active roles as in-service N-master ACs while the backup AC takes a passive role as standby One-slave AC. In failover state, the slave AC becomes active to take over the role of a failed master AC. In fallback state, the failed master AC becomes active again and comes back in-service and the slave AC takes the passive role and in standby state again. In order to perform the N+1 redundancy, master or slave controllers need to copy the latest running configurations of the peer AC every synchronization interval regardless of configuration change. Master or slave controllers also need to synchronize the latest running configuration with the peer controller in any configuration change between synchronization intervals. However, the synchronization of running configurations between peer ACs may fail due to the network or running environments of the N+1 network. In one example, the running configuration package is corrupted while transmitting from one peer to another due to any network interruption. In another example, when the slave AC tries to retrieve the running configuration package from a master AC, the master controller fails to make the package due to file system usage failure or abnormal compression. The slave controller may fail to copy the latest running configuration package from the master controller.

Therefore, there is a need for enhancing the synchronization of running configurations between peers of N+1 AC network.

SUMMARY

Systems and methods for synchronizing configurations between access point controllers (ACs) over N+1 network are provided. According to one embodiment, a first peer access point controller (AC) of a N+1 AC network sends a synchronizing request to a second peer AC of the n+1 AC network for synchronizing running configurations of the second peer AC. The first peer AC receives a running configuration package that contains the running configurations from the second peer AC and checks if the running configuration package is valid. If the package is valid, the first peer AC extracts the running configurations of the second peer AC from the running configuration package; and stores the running configurations of the second peer AC at a configuration repository of the first peer AC.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
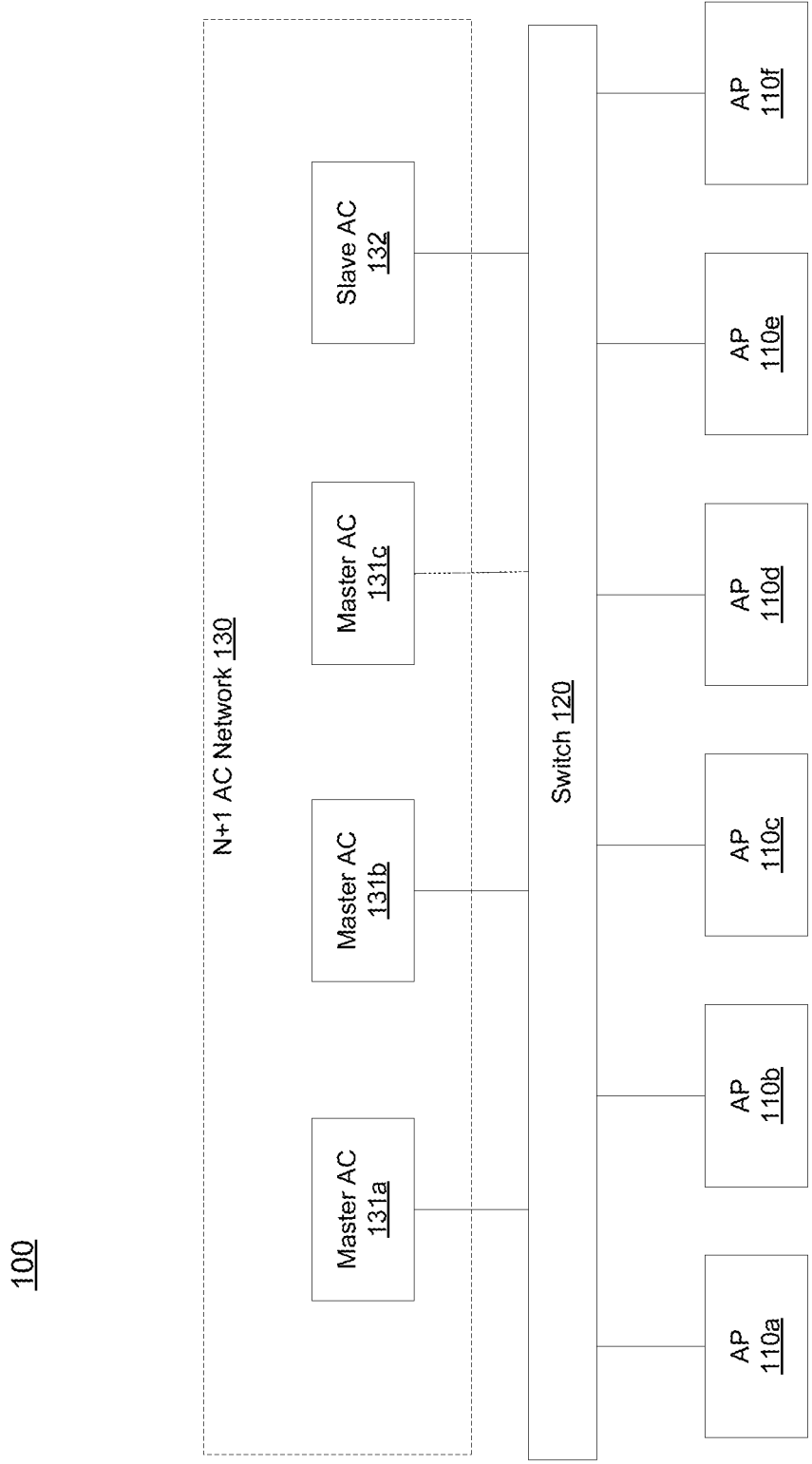
FIG. 1 illustrates exemplary network architecture in accordance with an embodiment of the present invention.

Systems and methods for synchronizing configurations between access point controllers (ACs) over N+1 network are provided. According to one embodiment, a first peer access point controller (AC) of a N+1 AC network sends a synchronizing request to a second peer AC of the n+1 AC network for synchronizing running configurations of the second peer AC. The first peer AC receives a running configuration package that contains the running configurations from the second peer AC and checks if the running configuration package is valid. If the package is valid, the first peer AC extracts the running configurations of the second peer AC from the running configuration package; and stores the running configurations of the second peer AC at a configuration repository of the first peer AC.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

FIG. 1 illustrates exemplary wireless network architecture 100 in accordance with an embodiment of the present invention. Wireless network architecture 100 comprises multiple access points (APs) 110a-110f, multiple master ACs 131a-113d and a slave AC 132. Each AP 110a-110f can provide a WiFi connection for WiFi clients/users that are within its coverage. WiFi clients may access a private or public network, such as the Internet through the APs. APs 110, master ACs 131 and slave AC 132 may be connected through a switch 120 or a local area network (LAN), wide area network (WAN) or the Internet. Each of ACs 132 may push AP profiles to one or more APs 110 and manage the wireless connectivity of APs 110 so that a WiFi client may roam between APs and network traffic of nearby APs may be load-balanced by ACs 131. Master ACs 131 and slave AC 132 may be composed of a n+1 AC network 130 in which each N, e.g. 5, master ACs 131 may be equipped with a slave AC 132 to provide n+1 redundancy.

In a first scenario, master ACs 131 are running in active role for controlling the operations of APs while slave AC 132 is running in passive role for backup master ACs 131. This is the normal state of n+1 AC network. Slave AC 132 may exchange keep-alive messages with each of master ACs 131 periodically (usually every 10 seconds) to ensure that the peers are working normally. Slave AC 132 may also send a synchronizing request to each of master AC 131 in a predetermined time interval (such as every 30 minutes). In one embodiment, the synchronizing request may be embedded in the keep-alive message that is sent from slave AC 132 to master AC 131. After receiving the synchronizing request, master AC 131 may return an acknowledge message to slave AC 132 and open a port, e.g. secure shell (SSH) port, to listen for the connection from slave AC 132. After receiving the acknowledge message, slave AC 131 may retrieve a running configuration package from the master AC 131 by, for example, SSH file transfer protocol (SFTP). The running configuration package comprises running information of master AC 131 that are needed for slave AC 132 to take over master AC 131 in case of failover. Slave AC 132 checks the integrity of the running configuration package to ensure that the package is generated and transferred without any error. If the package is valid, the running configurations of master AC 131 are extracted from the package and stored in a configuration repository of slave AC 132. If the package is not valid, slave AC 132 may start over the synchronization process and request the running configuration package again. Slave AC 132 synchronizes running configurations with all master ACs 131 and keep the latest running configurations of each master ACs 131 at its configuration repository. In case one of master ACs, such as master AC 131a, is out of work, slave AC 132 may retrieved the latest running configurations of master AC 131a from its configuration repository and take over operations of master AC 131a.

In a second scenario, the synchronization process may be initiated by an active master AC 131 in the middle of a synchronization interval. For example, when the running configuration, such as VPN settings of master AC 131a is updated by the administrator of the WiFi network in the middle of a synchronization interval, which is usually 30 minutes, master AC 131a may send a update notification message to slave AC 132 to trigger the synchronization process immediately without waiting for the next synchronization cycle. After receiving the update notification message from the active master AC 131a, slave AC 132 sends out a synchronizing request and retrieve the running configuration package as mentioned above.

In the present invention, the running configuration package is generated by master ACs 131 periodically or by the administrator of the WiFi network after configuration is updated. It is possible that the running configuration package of master AC 131a is not ready for retrieving at the time that slave AC 132 is trying to retrieve the package. In this scenario, master ACs 131 may send out an update notification message when the package is ready to slave AC 132 to trigger the synchronization process.

In a third scenario, one of master ACs 131, such as master AC 131a, runs in passive role while slave AC 132 runs in active role that takes over master AC 131a in controlling the operations of APs. This is the failover state of n+1 AC network 130 in which the latest running configuration is on the active slave AC 132. To synchronize running configuration with master AC 131a, slave AC 132 may put the latest running configuration package to master AC 131a. Master AC 131a may check if the package put by slave AC 132 is valid or not. If it is valid, the running configurations of active slave AC 132 may be stored at master AC 131a. If the package is not valid, master AC 131a may sends out a synchronizing request to slave AC 132 to start over the synchronization process.

In a forth scenario, a passive master AC 131a is ready to resume its operation which is the fallback state of n+1 AC network. Passive master AC 131a may send out a synchronizing request to active slave AC 132 asking for the latest running configurations. Active slave AC 132 may put the latest running configuration package to master AC 131a when the package is ready for transmission. The master AC 131a may check the integrity of the package transmitted by slave AC 132. If it is valid, Master AC 131 retrieves the running configurations of active slave AC 132 from the package and stored the running configurations at its configuration repository. Passive master AC 131a then takes over slave AC 132 and resumes the in-service state.

The synchronization processes of above scenarios will be described in detail below in reference to FIGS. 2-5.

Figure 2:
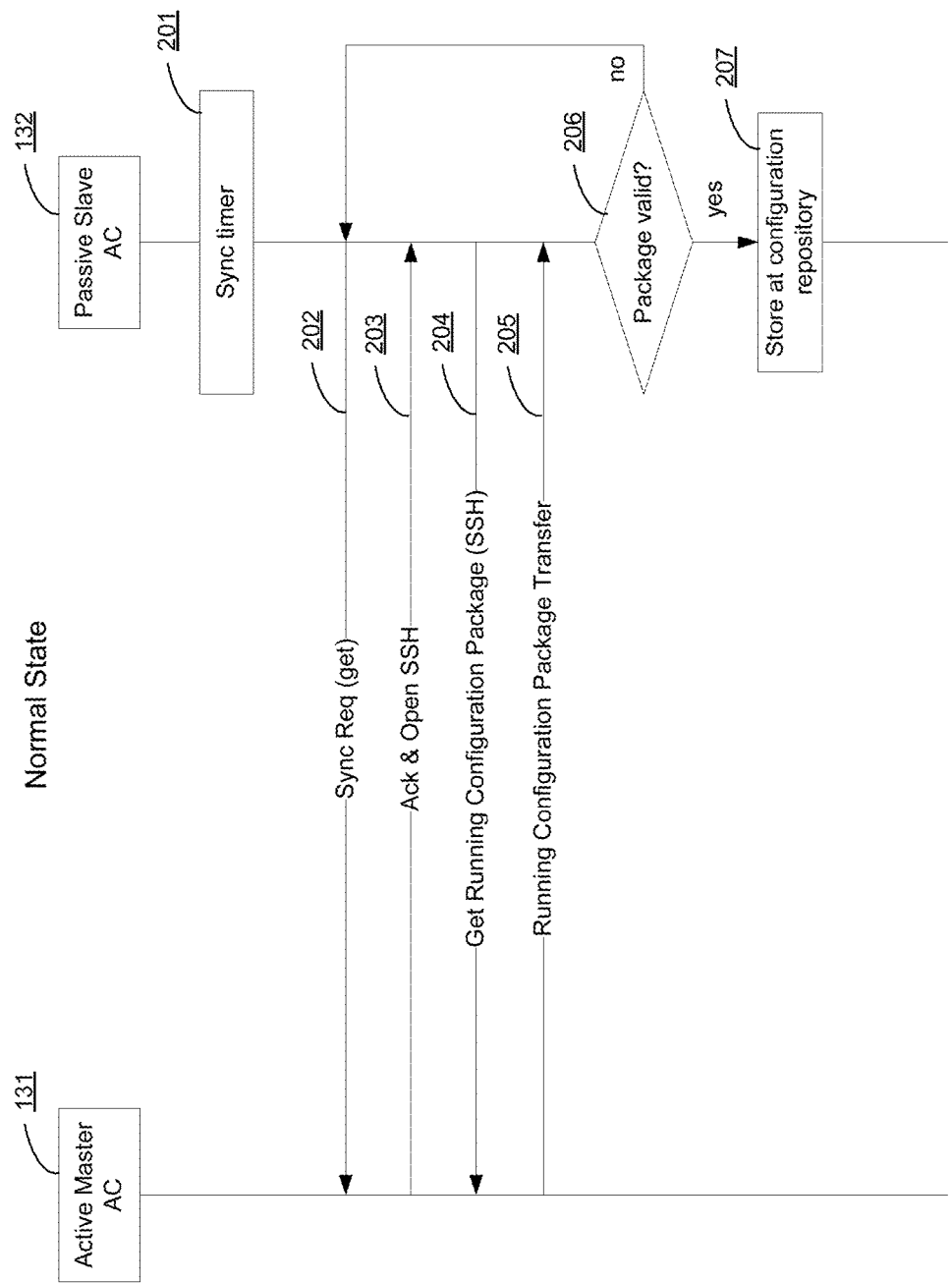
FIG. 2 is a flow diagram illustrating a method for synchronizing the latest running configurations between peer ACs of a n+1 network in accordance with a first embodiment of the present invention.

FIG. 2 is a flow diagram illustrating a method for synchronizing the latest running configuration between peer ACs of a n+1 network in accordance with a first embodiment of the present invention. In the present example, a n+1 AC network includes a master AC and a slave AC, such as master AC 131 and slave AC 132 of FIG. 1. The n+1 AC network is in normal state in which master AC 131 is running in active role to control APs of a WiFi network while slave AC 132 is running in passive role to backup the active master AC. The synchronization process is triggered by slave AC 132 in each synchronization cycle.

At step 201, a synchronization timer is running on passive slave AC 132 and a synchronization interval is setup, such as 30 minutes, for triggering running configuration synchronizing process. The synchronization interval is configurable by the administrator to accommodate the requirements of the WiFi network.

At step 202, a synchronizing request is sent from passive slave AC 132 to active master AC 131. It is understandable to those skilled in the art that the synchronizing request may comprise more information about the synchronizing request, such as if the slave AC will get running configuration from the master AC or put the running configuration to the master AC.

In another embodiment, master AC and slave AC may exchange keep-alive message in a predetermined interval to make sure that the link between master AC 131 and slave AC 132 is not broken. For example, slave AC 132 may send a normal keep-alive message to master AC 131 every 10 seconds. Thus, slave AC 132 may embeds the synchronizing request into a keep-alive message and send the keep-alive message with the synchronizing request to master AC 131.

At step 203, an acknowledge message is sent back from active master AC 131 to passive slave AC 132. Optionally, if active master AC 131 has closed its ports used for remote login or file transfer for safety reason, master AC 131 may open a port, such as SSH port, to listen for the connection and file transfer request from slave AC 132 after receiving the synchronizing request from slave AC 132.

At step 204, passive slave AC 132 sends a file transfer command to active master AC 131 through its SSH port in order to retrieve a running configuration package of active master AC 131. In another embodiment, a script file that includes a file transfer command stored on master AC 131 may be called by slave AC 132 to trigger the transmission of the package. Other commands used for checking the availability of the package, generating the running configuration package, starting over the synchronization process or error handling may also be contained in the script file.

The running configuration package includes running information of an active AC that is necessary for a passive AC to take over the role of the active AC. The running configuration package may include, but not limited to:
AP Init script (to use downloading a specific update from controller in middle of AP boot sequence);
certificates;
captive portal custom pages;
master AC's hostname;
master AC's admin accounts;
master AC's configurations, including reactive diagnostics, event log, syslog, virtual private network, local time, country and region, licenses, network;
master AC's network management suite (NMS) configuration, including running configuration database, notification database.

The running configuration package may be generated periodically or when running information of master AC 131 is changed. The running configuration package may also be generated by the administrator by a command or a script file that includes commands to trigger the generation of the running configuration package.

At step 205, the running configuration package is transferred from master AC 131 to slave AC 132. It is understandable to those skilled in the art that the package transmission may be implemented by any protocol that allows file transfer between two peers through a network, such as file transfer protocol (FTP), FTP over SSH (SFTP) or FTP over Secure Sockets Layer (SSL)/Transport Layer Security (TLS) (FTPS).

At step 206, slave AC 132 checks if the running configuration package received from master AC 131 is valid. In some cases, the running configuration package retrieved from master AC 131 may be invalid. The package may be not integrity when it is generated by master AC 131 due to an internal error. The package may be not integrity or changed when it is transferred on the network. Slave AC 132 checks the integrity of the package to ensure it is valid and not changed during network transmission. Any file integrity checking mechanism may be utilized for verifying the validity of running configuration package. For example, a checksum of running configurations may be calculated by master AC 131 and appended at the end of the package when the package is generated. After the package is received, slave AC 132 may calculate a checksum of the running configurations and compare it with the checksum appended by master AC 131. If the two checksums are identical, then the running configuration package is valid.

At step 207, the running configurations of master AC 131 are extracted from the package and stored at a configuration repository of slave AC 132. The slave AC 132 may comprise a configuration repository to store running configurations of master ACs of the n+1 AC network. During failover, the corresponding running configurations of the failed master AC may be retrieved from the configuration repository and slave AC 132 may take over the role of the failed master AC using the latest running configurations of the master AC.

At step 208, if the running configuration package is not valid, slave AC 132 may go back to step 202 to start the synchronization process again.

Figure 3:
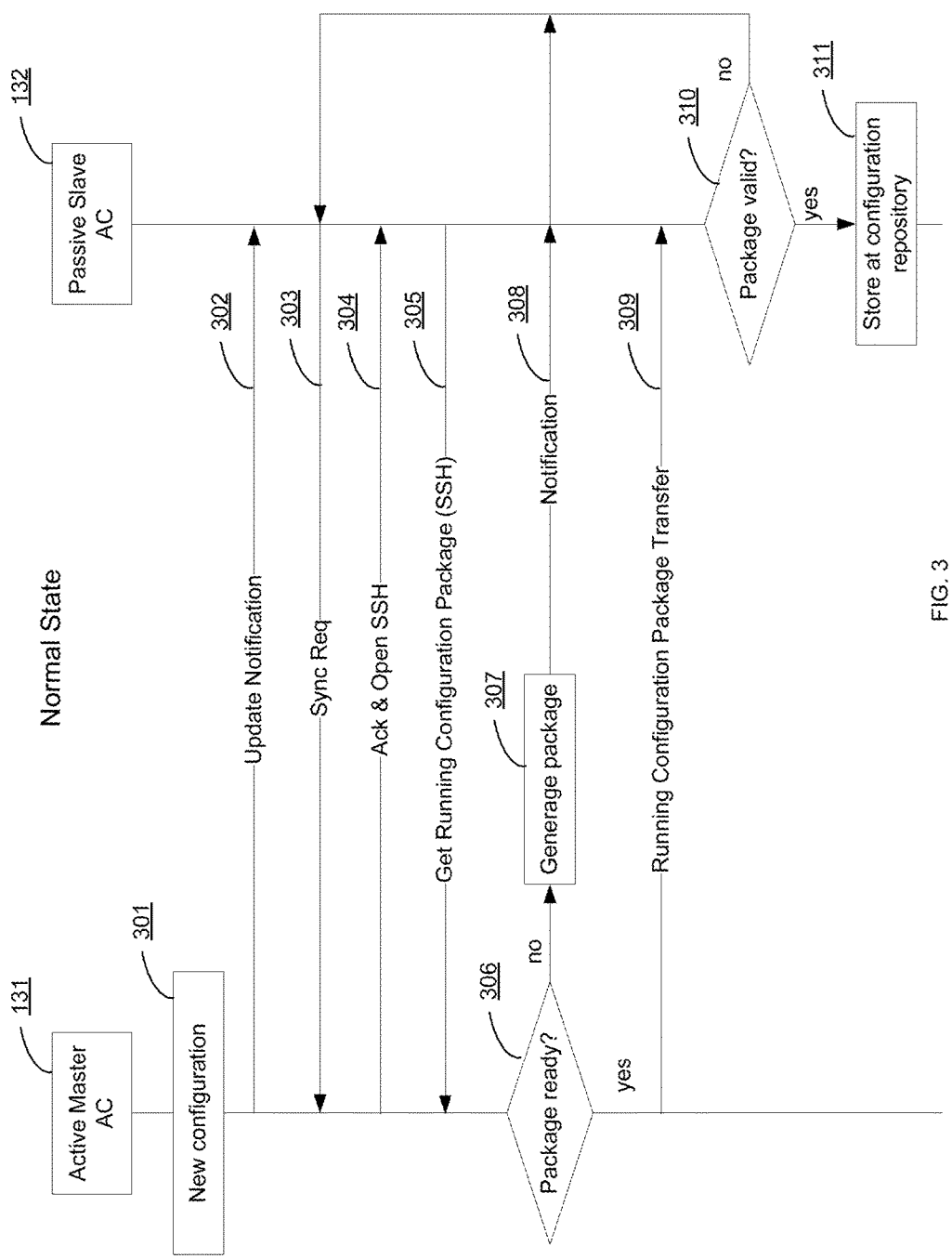
FIG. 3 is a flow diagram illustrating a method for synchronizing the latest running configurations between peer ACs of a n+1 network in accordance with a second embodiment of the present invention.

FIG. 3 is a flow diagram illustrating a method for synchronizing the latest running configuration between peer ACs of a n+1 network in accordance with a second embodiment of the present invention. In the present example, a n+1 AC network includes an active master AC and a passive slave AC in normal state and the synchronization process is triggered by active master AC.

At step 301, a synchronization process is triggered by master AC 131 when a running configuration of master AC 131 is updated at master AC. For example, the configuration of master AC 131 is updated by the administrator in the middle the synchronization interval. Then the synchronization process is triggered immediately instead of waiting until next synchronization cycle. It is obvious that the synchronization process may be triggered automatically or by the administrator through a command or a script file.

At step 302, master AC 131 may sends out a update notification message to slave AC 132. In one embodiment, the update notification message may be embedded in a keep-alive message that is exchanged between master AC 131 and slave AC 132.

At step 303, a synchronizing request is sent from passive slave AC 132 to active master AC 131 after the update notification message from master AC 131 is received by slave AC 132.

At step 304, an acknowledge message is sent back from active master AC 131 to passive slave AC 132. Optionally, after receiving the synchronizing request from slave AC 132, master AC 131 may open a port, such as SSH port, to listen for the connection and file transfer request from slave AC 132.

At step 305, passive slave AC 132 sends a file transfer command to active master AC 131 to retrieve a running configuration package from active master AC 131. As described above, a script file that contains a file transfer command and other commands may be called by slave AC 132 to trigger the transmission of the running configuration package.

At step 306, master AC 131 may check if the running configuration package is ready for transmission. Again, a command or a script file on master AC 131 may be called by slave AC 132 to check if the package is already generated and available for transmission.

If the running configuration package is not ready, master AC 131 may start to generate the package at step 307 and sends out a notification message to slave AC 132 again when it is ready for synchronization at step 308. Then the synchronization process goes to step 303 to start over.

If the running configuration package is ready, the package is transferred to slave AC 132 at step 309.

At step 310, slave AC 132 checks if the running configuration package received from master AC 131 is valid.

If the running configuration package received from master AC 131 is valid, the running configurations of master AC 131 are extracted from the package and stored at a configuration repository of slave AC 132 at step 311.

If the running configuration package is not valid, slave AC 132 may go back to step 303 to start the synchronization process again.

Figure 4:
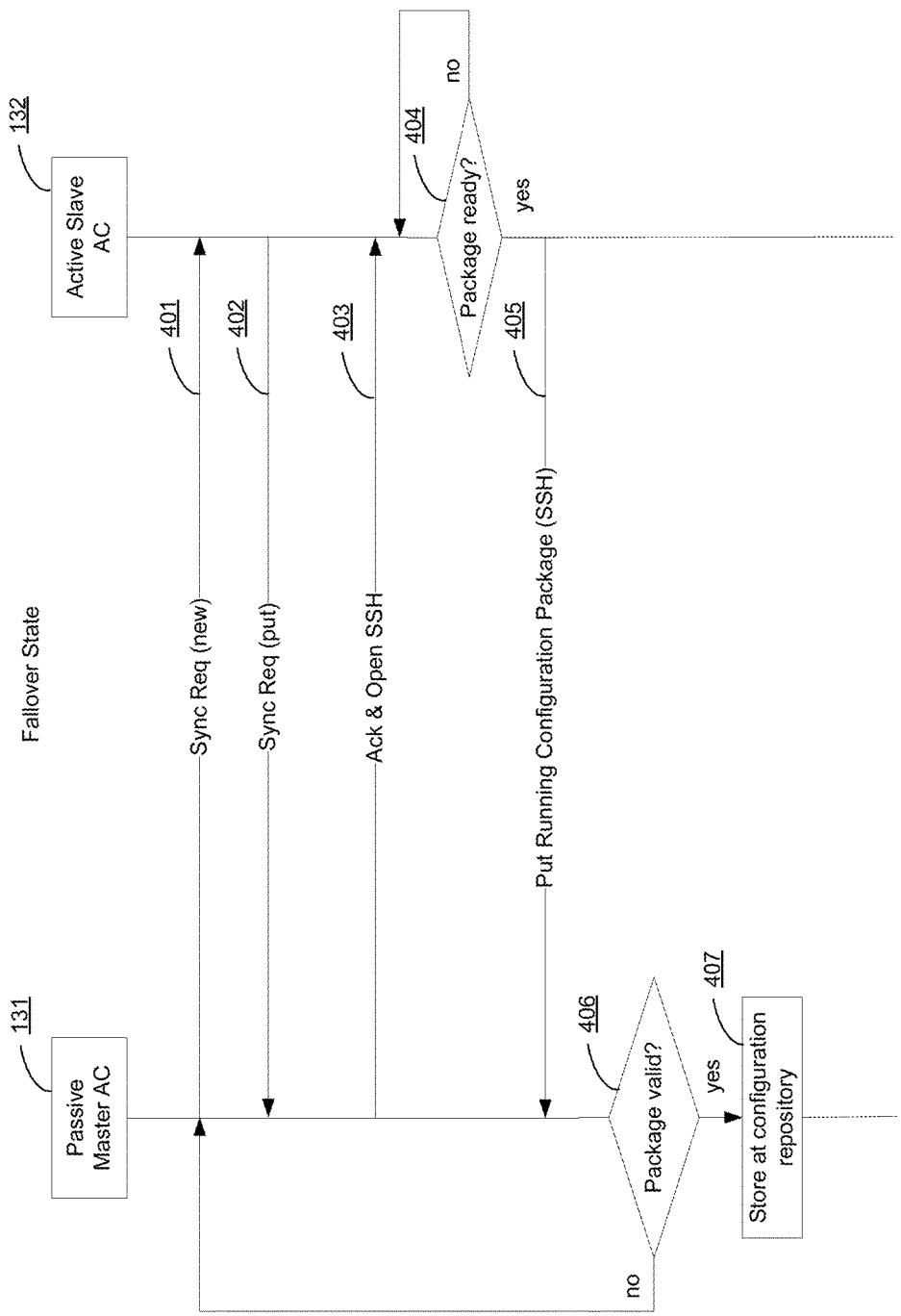
FIG. 4 is a flow diagram illustrating a method for synchronizing the latest running configurations between peer ACs of a n+1 network in accordance with a third embodiment of the present invention.

FIG. 4 is a flow diagram illustrating a method for synchronizing the latest running configuration between peer ACs of a n+1 network in accordance with a third embodiment of the present invention. In the present example, a n+1 AC network includes a passive master AC and an active slave AC in failover state. Passive master AC 131 is ready to fallback to normal state and needs the running configurations of active slave AC 132 in order to resume its service.

At step 401, passive master AC 131 sends out a synchronizing request to active slave AC 132 to trigger the synchronization process in order to acquire the running configurations of slave AC 132. Optionally, the synchronizing request may include a field that indicates the synchronizing request is requiring a new running configuration package. Optionally, the synchronizing request may be embedded into a keep-alive message that is exchanged between master AC 131 and slave AC 132.

At step 402, a synchronizing request is sent from active slave AC 132 to passive master AC 131 after the synchronizing request from master AC 131 is received. Optionally, the synchronizing request may include a field that indicates the synchronizing request is putting a new running configuration package to master AC 131.

At step 403, an acknowledge message is sent back from passive master AC 131 to active slave AC 132. Optionally, after receiving the synchronizing request from slave AC 132, master AC 131 may open a port, such as SSH port, to listen for a file transfer request from slave AC 132.

At step 404, active slave AC 132 may check if the running configuration package is ready for transmission. If the package is not ready, active slave AC 132 may wait until the package is generated.

At step 405, the running configuration package is transferred from active slave AC 132 to passive master AC 131 through a put command. It is understandable to those skilled in the art that the package transmission may be implemented by any protocol that allows file transmission through a network, such as file transfer protocol (FTP), FTP over SSH (SFTP) or FTP over Secure Sockets Layer (SSL)/Transport Layer Security (TLS) (FTPS).

At step 406, master AC 131 may check if the running configuration package received from slave AC 132 is valid. The integrity checking mechanism may be same as that described above at step 206 of FIG. 2.

If the running configuration package is valid, at step 407, the running configurations of active slave AC 132 are extracted from the package and stored at a configuration repository of master AC 131. Passive master AC 131 may resume its service using the running configurations retrieved from active slave AC 132 and fallback to in-service state.

If the running configuration package is not valid, the synchronization process goes back to step 401 to start over.

Figure 5:
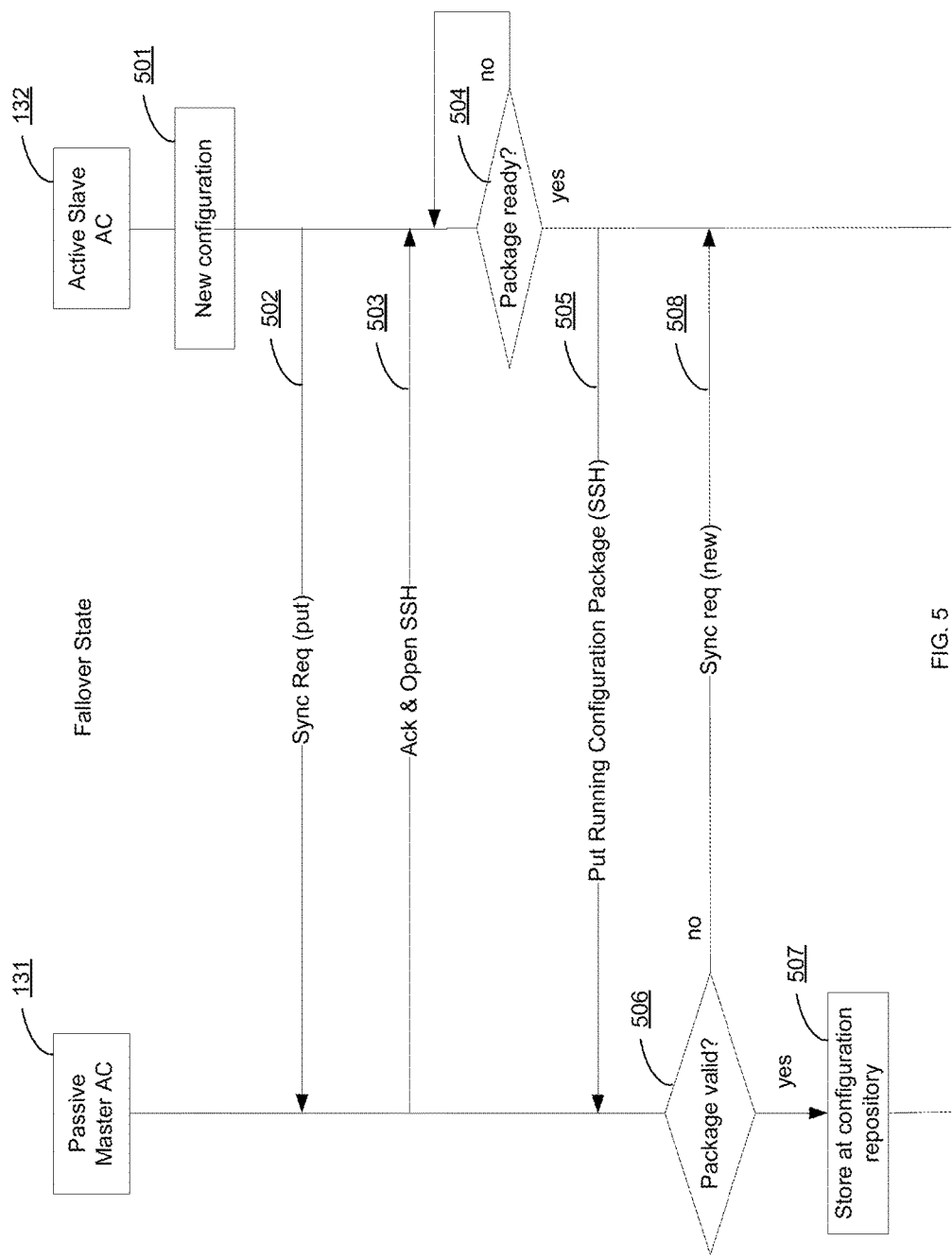
FIG. 5 is a flow diagram illustrating a method for synchronizing the latest running configurations between peer ACs of a n+1 network in accordance with a forth embodiment of the present invention.

FIG. 5 is a flow diagram illustrating a method for synchronizing the latest running configuration between peer ACs of a n+1 network in accordance with a forth embodiment of the present invention. In the present example, a n+1 AC network includes a passive master AC and an active slave AC in failover state.

At step 501, running configuration is updated at active slave AC 132 in the middle of a synchronization interval. Active slave AC 132 may start the synchronization process immediately instead of wait for the next synchronization cycle.

At step 502, a synchronizing request is sent from active slave AC 132 to passive master AC 131. Optionally, the synchronizing request may include a field that indicates the synchronizing request is for putting a new running configuration package to master AC 131.

At step 503, an acknowledge message is sent back from passive master AC 131 to active slave AC 132. Optionally, master AC 131 may open a port, such as SSH port, to listen for a connection and file transfer request from slave AC 132.

At step 504, active slave AC 132 may check if the running configuration package is ready for transfer. If the package is not ready, active slave AC 132 may wait until the package is generated.

At step 505, the running configuration package is transferred from active slave AC 132 to passive master AC 131 through a put command.

At step 506, master AC 131 may check if the running configuration package received from slave AC 132 is valid. The integrity checking mechanism may be same as that described above at step 206 of FIG. 2.

If the running configuration package is valid, at step 507, the running configurations of active slave AC 132 are extracted from the package and stored at a configuration repository of master AC 131.

If the running configuration package is not valid, a synchronizing request may be sent by passive master AC 131 to trigger the synchronization process to start over.

Figure 6:
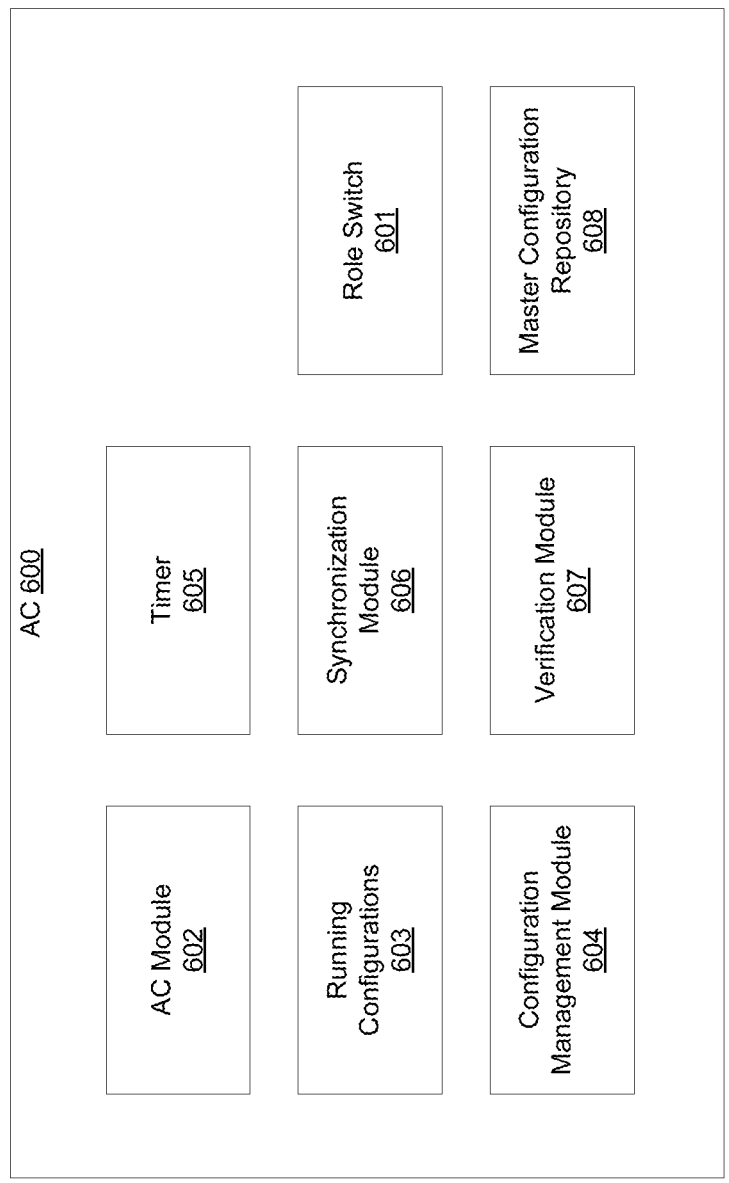
FIG. 6 illustrates exemplary functional units of an AC in accordance with an embodiment of the present invention.

FIG. 6 illustrates exemplary functional units of an AC 600 in accordance with an embodiment of the present invention. AC 600 may comprise a role switch 601, an AC module 602, running configurations 603, a configuration management module 604, a timer 605, a synchronization module 606, a verification module 607 and a master configuration repository 608.

AC 600 may be used as master AC or slave AC of a n+1 AC network. Role switch 601 is one or more options in system settings that allow the administrator of the n+1 AC network to determine if AC 600 works as a master AC that controls the running of APs of a WiFi network or as a slave AC that backups master ACs of the n+1 AC network in case of failover.

AC module 602 is used for managing the configurations/running of APs of the WiFi network when AC 600 is in active role. When an AP is connected to the WiFi network managed by AC 600, a management tunnel, e.g., a Control and Provisioning of Wireless Access Points (CAPWAP) control tunnel, may be established between the AP and AC module 602. AC module 602 may distribute operating system images, configuration settings and/or WiFi profiles to the AP. WiFi profile may include service set identification (SSID), security type, encryption type, security key and user credentials that will be used by the AP and WiFi client devices to establish wireless LAN connections. The AC module may also establish a data tunnel with an AP for managing the traffic transferred to/from the AP based on security policies. The functions of AC module are well-known to those skilled in the art and hence further description thereof will be omitted for brevity.

While AC 600 is in active role, running information about itself and APs that are managed by AC 600 may be stored in running configurations 603. Running configurations 603 include the information of an active AC that to be synchronized with a passive AC in order that the passive AC may take over the role of the active AC.

Configuration management module 604 is used for managing configurations of AC 600 by the administrator of the WiFi network through a graphic user interface (GUI) or a command line interface (CLI). When running configurations 603 are changed by the administrator through configuration management module 604, a synchronization process may be triggered to synchronizing running configurations 603 between an active AC and a passive AC.

Timer 605 is used for triggering the synchronization process between an active AC and a passive AC periodically. In one embodiment, a synchronization interval may be set to 30 minutes. A dedicated synchronizing request may be sent to a peer AC at each synchronization interval. In another embodiment, timer 605 may be used for triggering a keep-alive message exchange between peer ACs in a short period, e.g. every 10 seconds. The synchronizing request may be embedded to a keep-alive message in the synchronization interval.

Synchronization module 606 is used for managing the synchronization of running configurations between peer ACs in accordance with the role (master or slave) and the state (active/passive) of AC 600.

Scenario 1: AC 600 is running as a slave AC and in passive state (normal state of n+1 AC network)

Synchronization module 606 may send out a synchronizing request to an active master AC in each synchronization cycle. After an acknowledge message is received from the peer master AC, synchronization module 606 may retrieve a running configuration package from the peer master AC.

Scenario 2: AC 600 is running as a master AC and in active state (normal state of n+1 AC network)

Synchronization module 606 may send out an acknowledge message when a synchronizing request is received from a slave AC. Synchronization module 606 may also open the SSH port of AC 600 and wait for accessing from the slave AC.

Further, if any running configuration is updated at the active master AC, synchronization module 606 may trigger a synchronization process by sending a update notification message to the slave AC without waiting for the next synchronization interval.

Scenario 3: AC 600 is running as a slave AC and in active state (failover state of n+1 AC network)

When synchronization module 606 receives a synchronizing request from a passive master AC, synchronization module 606 may start the synchronization process by sending a synchronizing request to the passive master AC. After an acknowledge message is received from the passive master AC, synchronization module 606 may put the running configuration package to the passive master AC.

Scenario 4: AC 600 is running as a slave AC and in active state (failover state of n+1 AC network)

If any running configuration is updated at the active slave AC, synchronization module 606 may trigger a synchronization process by sending a synchronizing request to the master AC without waiting for the next synchronization interval.

After synchronization module 606 retrieves a running configuration package from a peer AC, verification module 607 checks the integrity of the package. A checksum of the running configurations may be calculated and compared with the checksum included in the package to determine if the running configuration package received from the peer AC is valid.

If the running configuration package is valid, the running configurations may be extracted from the package. If AC 600 is a slave AC, the running configurations may be stored in master configuration repository 608. As master configuration repository 608 of slave AC keeps copies of running configurations of master ACs of the n+1 AC network, a slave AC may take over the role of a master AC in case of failover.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A computer-implemented method for synchronizing configurations between access point controllers over N+1 networks for data communication, the method comprising:
   sending, by a first peer access point controller (AC) of a N+1 AC network, a synchronizing request to a second peer AC of the N+1 AC network for synchronizing running configurations of the second peer AC;
   receiving, by the first peer AC, a running configuration package that contains the running configurations from the second peer AC;
   checking, by the first peer AC, if the running configuration package is valid;
   extracting, by the first peer AC, the running configurations of the second peer AC from the running configuration package if the package is valid; and
   storing, by the first peer AC, valid running configurations of the second peer AC at a configuration repository of the first peer AC,
   wherein the first peer AC is an active slave AC of the N+1 AC network in service state and the second peer AC is a passive master AC in fallback state;
   sending, by the passive master AC, a synchronizing request to the active slave AC when the passive slave is to be fallback to normal state;
   sending, by the active slave, a synchronizing request to the passive master AC after the active slave AC receives the synchronizing request from the passive master AC;
   opening, by the passive master AC, a port for receiving the running configuration package from the active slave AC;
   putting, by the active slave AC, the running configuration package to the passive master AC;
   checking, by the passive master AC, if the running configuration package is valid;
   requesting, by the passive master AC, the running configurations again if the package is not valid; and
   storing, by the passive master AC, the running configurations of the active slave AC at a configuration repository of the passive master AC.

2. The method of claim 1, wherein the first peer AC is a passive slave AC of the N+1 AC network in standby state and the second peer AC is an active master AC in normal service state.

3. The method of claim 2, wherein the passive slave AC comprises a timer for triggering the synchronizing request periodically.

4. The method of claim 2, further comprises:
   updating, by the active master AC, the running configurations of the active master AC;
   sending, by the active master AC, a update notification to the passive slave AC.

5. The method of claim 2, further comprises:
   sending, by the active master AC, an acknowledge message to the passive slave AC when the synchronizing request from the passive slave AC is received;
   opening, by the active master AC, a port for transferring the running configuration package to the passive slave AC.

6. The method of claim 1, wherein the first peer AC is an active slave AC of the N+1 AC network in service state and the second peer AC is a passive master AC in fallback state.

7. The method of claim 1, further comprises:
   checking, by the active slave AC, if the running configuration package is ready for transmitting;
   generating, by the active slave AC, the running configuration package if the package is not ready; and
   starting, by the active slave AC, to put the running configuration package to the passive master after the package is generated.

8. The method of claim 6, further comprises:
   updating, by the active slave AC, the running configurations of the active slave AC; and
   sending, by the active slave AC, a second synchronizing request to the passive master AC.

9. The method of claim 1, wherein the synchronizing request is transmitted within a keep-alive message sending between the peer ACs.

10. The method of claim 1, wherein the running configuration packages includes one or more of:
    certificates;
    captive portal custom pages;
    master AC's hostname;
    master AC's admin accounts;
    master AC's configurations, including reactive diagnostics, event log, syslog, virtual private network, local time, country and region, licenses, network; and
    master AC's network management suite (NMS) configuration, including running configuration database, notification database.

11. The method of claim 1, further comprises:
    requesting, by the first peer AC, the running configuration of the second peer AC again if the package is not valid.

12. A computer system comprising:
    a non-transitory storage device; and
    one or more processors coupled to the non-transitory storage device and operable to execute the one or more routines to perform a method comprising:
        sending, by a first peer access point controller (AC) of a N+1 AC network, a synchronizing request to a second peer AC of the N+1 AC network for synchronizing running configurations of the second peer AC;
        receiving, by the first peer AC, a running configuration package that contains the running configurations from the second peer AC;
        checking, by the first peer AC, if the running configuration package is valid;
        extracting, by the first peer AC, the running configurations of the second peer AC from the running configuration package if the package is valid; and
        storing, by the first peer AC, valid running configurations of the second peer AC at a configuration repository of the first peer AC, wherein the first peer AC is an active slave AC of the N+1 AC network in service state and the second peer AC is a passive master AC in fallback state;

sending, by the passive master AC, a synchronizing request to the active slave AC when the passive slave is to be fallback to normal state;

sending, by the active slave, a synchronizing request to the passive master AC after the active slave AC receives the synchronizing request from the passive master AC;

opening, by the passive master AC, a port for receiving the running configuration package from the active slave AC;

putting, by the active slave AC, the running configuration package to the passive master AC;

checking, by the passive master AC, if the running configuration package is valid;

requesting, by the passive master AC, the running configurations again if the package is not valid; and storing, by the passive master AC, the running configurations of the active slave AC at a configuration repository of the passive master AC.

13. The computer system of claim 12, wherein the first peer AC is a passive slave AC of the N+1 AC network in standby state and the second peer AC is an active master AC in normal service state.

14. The computer system of claim 13, wherein the passive slave AC comprises a timer for triggering the synchronizing request periodically.

15. The computer system of claim 13, wherein the method further comprising:

updating, by the active master AC, the running configurations of the active master AC;

sending, by the active master AC, a update notification to the passive slave AC.

16. The computer system of claim 13, wherein the method further comprising:

sending, by the active master AC, an acknowledge message to the passive slave AC when the synchronizing request from the passive slave AC is received;

opening, by the active master AC, a port for transferring the running configuration package to the passive slave AC.

17. The computer system of claim 12, wherein the first peer AC is an active slave AC of the N+1 AC network in service state and the second peer AC is a passive master AC in fallback state.

18. The computer system of claim 12, wherein the method further comprising:

checking, by the active slave AC, if the running configuration package is ready for transmitting;

generating, by the active slave AC, the running configuration package if the package is not ready; and starting, by the active slave AC, to put the running configuration package to the passive master after the package is generated.

19. The computer system of claim 17, further comprises:

updating, by the active slave AC, the running configurations of the active slave AC; and sending, by the active slave AC, a second synchronizing request to the passive master AC.

20. The computer system of claim 12, wherein the synchronizing request is transmitted within a keep-alive message sending between the peer ACs.

21. The computer system of claim 12, wherein the running configuration packages includes one or more of:

certificates;

captive portal custom pages;

master AC's hostname;

master AC's admin accounts;

master AC's configurations, including reactive diagnostics, event log, syslog, virtual private network, local time, country and region, licenses, network; and master AC's network management suite (NMS) configuration, including running configuration database, notification database.

22. The computer system of claim 12, wherein the method further comprising:

requesting, by the first peer AC, the running configuration of the second peer AC again if the package is not valid.

* * * * *